United States Patent
Oldfield et al.

(12) 
(10) Patent No.: US 6,504,817 B2
(45) Date of Patent: *Jan. 7, 2003

(54) FIBER CHANNEL ARBITRATED LOOP DYNAMIC LOOP SIZING

(75) Inventors: Barry J. Oldfield, Boise, ID (US); Robert G. Mejia, Boise, ID (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,985

(22) Filed: Mar. 31, 1997

(65) Prior Publication Data

US 2002/0012342 A1 Jan. 31, 2002

(51) Int. Cl.[7] .................................................. H04L 1/00
(52) U.S. Cl. ............................ 370/217; 370/223; 714/4
(58) Field of Search ................................. 370/221, 222, 370/223, 224, 225, 405, 227, 228, 249, 461, 216, 217; 714/4

(56) References Cited

U.S. PATENT DOCUMENTS

| | | | |
|---|---|---|---|
| 4,393,497 A | | 7/1983 | Cantwell, Jr. ............... 370/424 |
| 5,084,863 A | | 1/1992 | Guezou et al. ............. 370/223 |
| 5,729,692 A | * | 3/1998 | Qiu et al. .................... 370/222 |
| 5,732,211 A | * | 3/1998 | Efron et al. ................. 370/405 |
| 5,754,549 A | * | 5/1998 | DeFoster et al. ........... 370/405 |
| 5,757,642 A | * | 5/1998 | Jones ............................. 700/5 |
| 5,815,489 A | * | 9/1998 | Takatori et al. ............. 370/223 |
| 5,892,924 A | * | 4/1999 | Lyon et al. .................. 370/405 |
| 5,922,077 A | * | 7/1999 | Espy et al. ..................... 714/7 |
| 5,923,449 A | * | 7/1999 | Doerr et al. ................. 370/223 |

FOREIGN PATENT DOCUMENTS

| | | |
|---|---|---|
| EP | 0751464 A1 | 1/1997 |
| WO | WO92/04787 | 3/1992 |
| WO | WO97/04384 | 2/1997 |
| WO | WO97/07458 | 2/1997 |

OTHER PUBLICATIONS

Search Report
Robert W. Kembel; In–Depth Fibre Channel Arbitrated Loop; 1996/1997, XP–002055479; p. 42–43 and p. 269–282.

* cited by examiner

Primary Examiner—Chau Nguyen
Assistant Examiner—D. Trinh
(74) Attorney, Agent, or Firm—Lane R. Simmons

(57) ABSTRACT

In a Fiber Channel Arbitrated Loop communications architecture, dynamic loop sizing includes selectively bypassing operational device ports in the loop in order to minimize overhead associated with loop size. In redundant systems with multiple loops, the system is optimized by judicious distribution of the bypassed ports among the loops. Redundancy is at no point reduced. By bypassing unused or unneeded ports off of a loop, the round trip delay of the loop is appreciably shortened. By minimizing the round trip delay, arbitration overhead and access latency is reduced, and loop bandwidth and overall performance is improved. Dynamic load sharing balances the load between the dual loops when using dual ported devices on the loops. Dynamic load sharing is accomplished by bypassing a given subset of devices off each loop to reduce round trip delay; monitoring traffic on the loops; and controlling which devices are attached to which loop in order to balance the load across the loops. Dynamic system configuration features provide an optimized system configuration on a discretely continuous basis, including implementing dynamic loop sizing, dynamic load sharing, and managing the interconnection of multiple loops and controllers.

27 Claims, 4 Drawing Sheets

— ACTIVE LINK
- - - INACTIVE LINK

— ACTIVE LINK
--- INACTIVE LINK

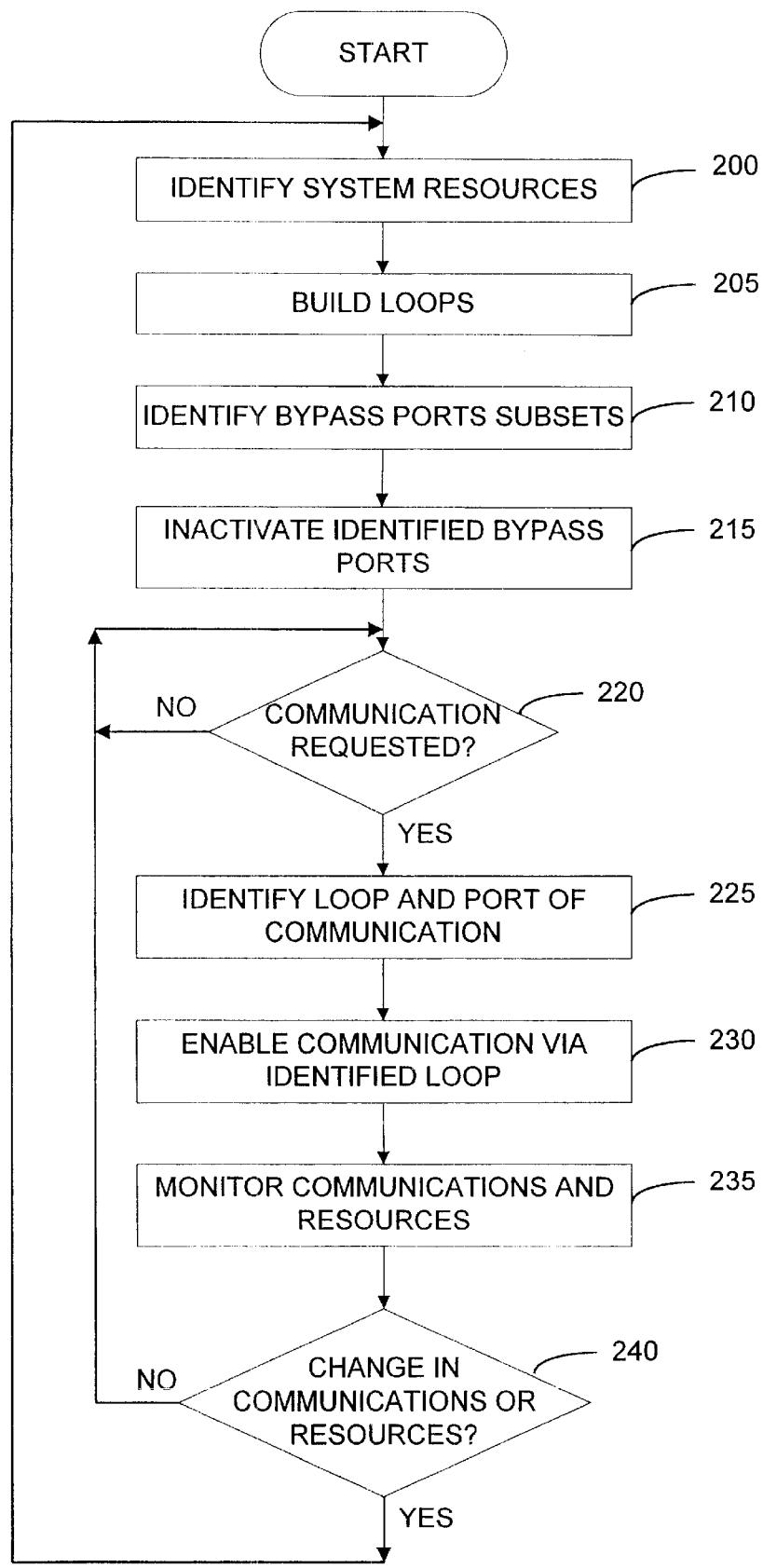

FIBER CHANNEL ARBITRATED LOOP DYNAMIC LOOP SIZING

FIELD OF THE INVENTION

This invention relates in general to redundant systems and data communication architectures and, more particularly, to performance features of a fibre channel arbitrated loop in a redundant system.

BACKGROUND OF THE INVENTION

Fibre Channel (FC) is a high speed serial communications architecture for transmitting data from one communication port to a next (i.e., a point to point communication link). Data transfer rates on the order of 100 mega bytes per second (or 1 giga bits per second) are achievable. Devices, such as hard disks and controllers for Redundant Arrays of Inexpensive Disks (RAID controllers), have one or more communication ports that are attached to the FC links. Each port has an input and an output. The ports can be connected in a daisy chain configuration to form a loop over which communication transmissions are passed. Current standards support up to 126 devices on the loop. In order to maintain order on the loop, a loop protocol, which includes an arbitration protocol, is used to determine which port (device) has control of the loop. This configuration and loop protocol are known as a Fibre Channel Arbitrated Loop (FC-AL).

In FC-AL each port examines the incoming data (as the data is passed around the loop) to determine if any action is appropriate to be taken. Each port simply re-transmits the data if that port is not involved in the current activity. This data "checking" or "snooping" requires time and causes a significant amount of delay to be added between the input and output of the data at the port. These "port" delays in connection with "propagation" delays through the port-to-port communication links add up to a round trip loop delay. The round trip loop delay is the time for data to travel from a port's output around the loop and back to its input. Round trip loop delay is typically dominated by port delays.

To gain control of the loop a port transmits a special packet of information known as an arbitration primitive. If the arbitration primitive can make a complete trip around the loop without a higher priority node substituting its own arbitration primitive, the node wins control of the loop. In other words, if a port receives back the arbitration primitive it sent, it has won arbitration. In addition to gaining control of the loop, there is another round trip of overhead incurred for the port that won arbitration to make contact with the port with which it desires to communicate.

To protect loops from having a failing port (or device) cause a break in the loop, a routing device known as a port bypass circuit (PBC) is used. A PBC is a device that duplicates its received input signal. One copy is sent to a multiplexer inside the PBC and the other is driven on the "local" output. The "local" output of the PBC is connected to the input of a respective port. The output of the port is connected to the "local" input of the PBC which is also connected to the PBC's internal multiplexer. The output of the multiplexer is driven to the PBC's output which is connected to the next PBC on the arbitrated loop.

When a node (device) is active and functional, the multiplexer in the PBC selects the local input from the port to drive the output to the rest of the loop. When the node is dysfunctional or absent, the multiplexer will select the input directly from the input connected to the previous PBC. However, the data stream coming into the PBC is always provided to the port so that it can monitor the loop traffic for messages that may affect it. This is important since in some architectures the port has control over the multiplexer in its associated PBC. When bypassed, however, the port does not drive data onto the loop.

The delay through a port is more than 50 times the delay through a PBC in bypass mode. The port delay is also significantly larger than the delay associated with the interconnecting media between ports in typical array applications. Thus, the more operational devices that are connected to a given FC-AL, the longer it takes for arbitration to occur and the higher the overhead penalty. Disadvantageously, the increased overhead reduces the available bandwidth.

Accordingly, an object of the present invention is to improve performance of a Fibre Channel Arbitrated Loop in a redundant system.

SUMMARY OF THE INVENTION

According to principles of the present invention in a preferred embodiment, in a Fibre Channel Arbitrated Loop communications architecture, dynamic loop sizing includes selectively bypassing operational device ports in the loop in order to minimize overhead associated with loop size. In redundant systems with multiple loops, the system is optimized by judicious distribution of the bypassed ports among the loops. Redundancy is at no point reduced. By bypassing unused or unneeded ports off of a loop, the round trip delay of the loop is appreciably shortened. By minimizing the round trip delay, arbitration overhead and access latency is reduced, and loop bandwidth and overall performance is improved.

According to further principles, dynamic load sharing balances the load between dual loops when using dual ported devices on the loops. Dynamic load sharing is accomplished by bypassing a given subset of devices off each loop to reduce round trip delay; monitoring traffic on the loops; and controlling which devices are attached to which loops in order to balance the load across the loops.

According to yet further principles, dynamic system configuration features provide an optimized system on a discretely continuous basis, including implementing dynamic loop sizing, dynamic load sharing, and managing the interconnection of multiple loops and controllers.

Other objects, advantages, and capabilities of the present invention will become more apparent as the description proceeds.

DESCRIPTION OF THE DRAWINGS

FIG. 4 is a flow diagram depicting a method of the present invention.

DETAILED DESCRIPTION OF THE INVENTION

Figure 1:
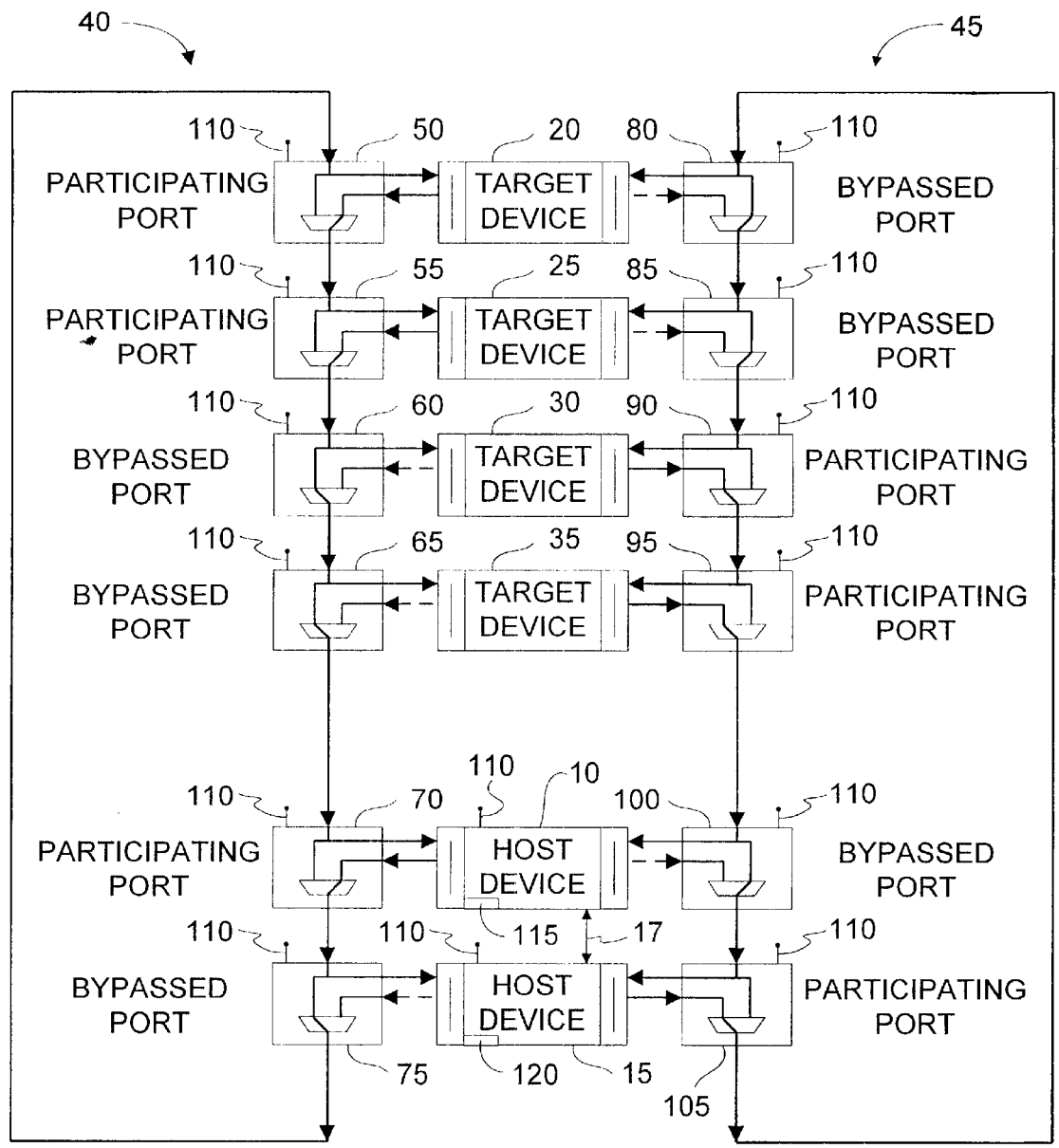
FIG. 1 is a block diagram of a Fibre Channel dual arbitrated loop system according to principles of the present invention.

FIG. 1 is a block diagram of a Fibre Channel dual arbitrated loop system according to principles of the present invention. Two host devices 10 and 15 are connected to four target devices 20, 25, 30, and 35 (20–35) via separate communication links (fibre channel loops) 40, 45 and via respective routing devices 50, 55, 60, 65, 70, 75, 80, 85, 90, 95, 100, and 105 (50–105). Loops 40 and 45 are capable of sustaining data communication transmissions as conventional in the art. In the example depicted and discussed, host devices 10 and 15 are controller boards for a disk system having communication capabilities therebetween 17 for sharing control information, data and/or work load. The disk system includes disk drives (target devices) 20–35. The dual host devices 10 and 15 and dual loops 40 and 45 provide redundancy of control and communication for improved system management and handling of device and communications failure. Preferably, disk devices 20–35 are also configured to provide data redundancy, such as under a RAID 1 (mirror) or RAID 5 (parity/stripe) scheme, or a combination thereof.

Each host and disk drive is a dual ported device for interconnecting with each of the dual fibre channel loops 40 and 45. Each routing device 50–105 is a port bypass circuit (PBC) for transmitting data from its respective loop to its respective target device and/or from the target device to the loop, and/or for causing the loop data transmissions to bypass the respective target device and to continue on around the loop to the next PBC.

Each PBC 50–105 may be controlled by conventional multiplexing techniques for enabling bypassing of its respective port in the event of a disfunctional or absent port, and for having the port drive data onto the loop through the PBC in the event of a functional/active port. However, in addition to conventional PBC control/functionality, control system 110 also directly controls the functionality of each PBC. Specifically, in a preferred embodiment, firmware and/or circuitry 115, 120 in each host device 10, 15 also controls each PBC 50–105 via control system 110. Control system 110 is any conventional electrical, optical, infrared, etc. connection between the host devices and each PBC. In a preferred embodiment, the control system is implemented as a communications channel separate from the arbitrated loop. Alternatively, the control system is implemented via the arbitrated loop.

Active links between devices (ports) and PBCs for each loop 40, 45 are designated with solid directional lines. A "participating port" (of a device) communicates with its loop via an active link. For example, with respect to loop 40, target devices 20 and 25 and host device 10 are each shown communicating with the loop (i.e., are participating ports) via PBCs 50, 55 and 70 respectively. The solid directional lines represent data flowing in the indicated direction for the respective loop, and further indicate that the respective device is receiving data from the loop and retransmitting the data back onto the loop under general FC-AL principles. All the active links for a given loop define the data transmission path for that respective loop.

Inactive links are designated with dashed lines and each inactive link represents a "bypassed port" status for the device. For example, with respect to loop 40, target devices 30 and 35 and host device 15 are each shown as having inactive links with their ports being bypassed via PBCs 60, 65 and 75 respectively. A bypassed port does not drive data onto its loop. Although data may actually be passing from a device over the "dashed line" (inactive link) to the PBC, that data is not being passed through the PBC and is thus not driven onto the loop. Rather, data received into that particular PBC from the previous PBC on the loop is transmitted directly on to the next PBC in the loop. As mentioned, the multiplexor configuration within the PBC determines the data path. Thus, a "bypassed port" indicates that the device (port) is not retransmitting (i.e., is not driving) data back onto the loop.

Figure 2:
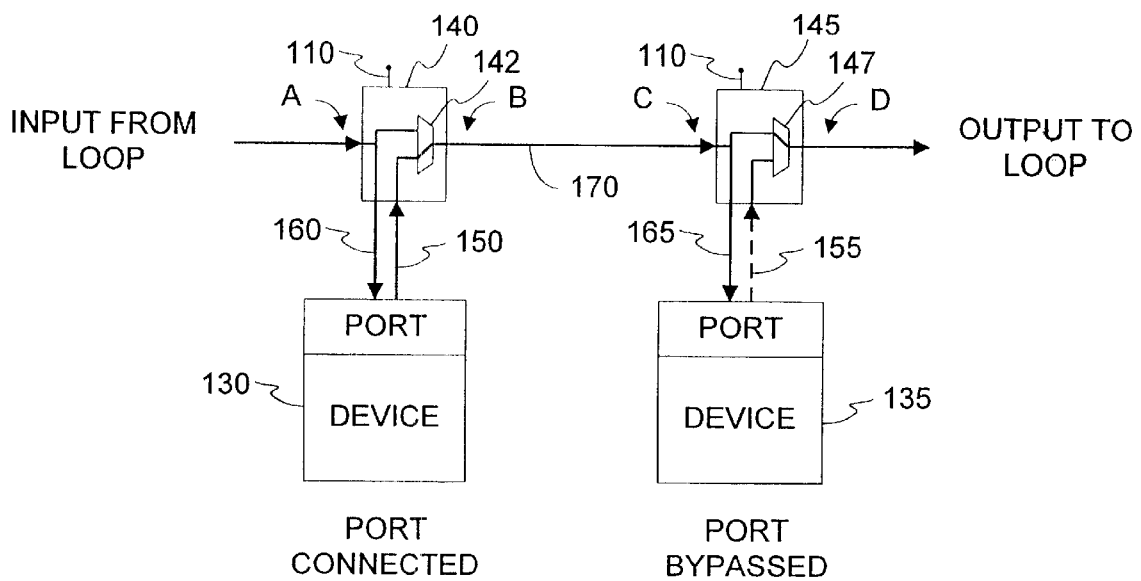
FIG. 2 is a block diagram of a port bypass operation.

FIG. 2 more clearly depicts a port bypass operation. As an example, device 130 is connected via its port to PBC 140, and PBC 140 is connected to fibre channel loop 170. Device 135 is connected via its port to PBC 145, and PBC 145 is also connected to the loop. Because of the multiplexor configuration 142 within PBC 140, device 130 is considered to have an "active link" with respect to PBC 140 and loop 170. Namely, data received from the loop through link 160 is transmitted through device 130 (its port) and then back through link 150 to PBC 140 and ultimately back onto the loop 170. In contrast, device 135 has an "inactive link" (represented by dashed directional line 155) with respect to PBC 145 and loop 170. The inactive link represents that data is not being driven onto the loop from device 135. Rather, data is transmitted into PBC 145 directly from loop 170 and then, due to the multiplexor configuration 147 of PBC 145, transmitted straight through PBC 145 and on down the loop.

Accordingly, the data transmission delay time between points "A" and "B" on loop 170 (with respect to the "active link" 150 of device 130) is at least 50 times the delay between points "C" and "D" (with respect to "inactive link" 155). Thus, it is easily seen that data transmission delay is dramatically reduced if the data can be forced to bypass a given device on a loop.

Referring again now to FIG. 1, an object of the present invention is to reduce total round trip delay for a given loop by reducing the overhead associated with the loop size. This is accomplished in a redundant system environment by bypassing selected ports on the loop according to dynamic loop sizing schemes and, preferably, by implementing dynamic system configuration and load sharing schemes.

Under the present invention, selected subsets of normally operational ports (or devices) in a redundant system are bypassed to improve overall system performance and efficiency without losing the desired redundancy of the system. The system is optimized by judicious distribution of the ports among the loops. For example, in FIG. 1, with respect to loop 40, the ports of target devices 30 and 35 are bypassed at PBC 60 and 65 respectively (identified by the dashed lines and reference wording), and the port of host device 15 is bypassed at PBC 75. On the other hand, with respect to loop 45, the ports of target devices 20 and 25 are bypassed at PBC 80 and 85 respectively, and the port of host device 10 is bypassed at PBC 100. Thus, in this example, half the ports on each loop are bypassed, even though the devices are operational, but redundancy is maintained in the event of failure in a loop or device. For example, if loop 45 fails, PBCs 60 and 65 are reconfigured to provide active links to target devices 30 and 35 such that they become participating ports on loop 40.

Again, the removing of selected subsets of ports of operational devices from the loop by activating their respective PBCs effectuates a dynamic loop sizing scheme whereby Fibre Channel arbitrated loop (FC-AL) performance is improved. As discussed, this is effective because a bypassed port inserts less delay into the loop than does an active port. The delays from all of the ports in the loop combine to form the loop's round trip delay. As well known, the round trip delay must be traversed several times in the process of arbitrating for the loop and establishing a connection between a pair of ports that wish to communicate. By reducing the round trip delay under the present invention, the overhead from arbitration and for the establishing of a connection is reduced. This clearly improves throughput (I/O's per second) and bandwidth (Mbytes per second) of the loop.

As mentioned, firmware/circuitry 115, 120 of host devices 10, 15 control activation of the PBCs via control system 110 to implement the specific configuration that defines which ports are bypassed for the respective operational target devices. This control is used in conjunction with conventional multiplexor bypassing of a port in the event of a disfunctional and/or inoperational device. Significantly, however, redundancy capability is at no point reduced. The only penalty is that the proper loop must be chosen in order to access a particular target device.

In the event a specific target device is not operational, conventional bypass of a port may occur at its respective PBC without intervention from host controller devices 10, 15. However, upon detection of such a failure, dynamic system reconfiguration may, optionally, occur again to best configure which ports are to be bypassed for the respective remaining operational target devices to best balance load sharing among the devices.

As mentioned, dynamic load sharing balances the load as between dual loops when using dual ported devices on the loops, and as between multiple loops when more than two loops are used. The first step for load sharing includes bypassing selected devices off of each loop (for example, half, as illustrated in FIG. 1). The effect of this is to make the round trip delay and arbitration overhead smaller for each loop thus improving the overall throughput of the system. The second step involves monitoring traffic on the loops and controlling which devices are attached to which loop in order to balance the load across the loops. Intelligent control of load sharing is also advantageous. One example of this is to maintain one loop as a low node count loop with lower latency and more available bandwidth for high priority traffic and, simultaneously, maintain the other loop as a high node count loop with greater connectivity but with longer latency and less available bandwidth for lower priority traffic. Various other configurations are also feasible, depending on traffic monitored and resources available.

Figure 3:
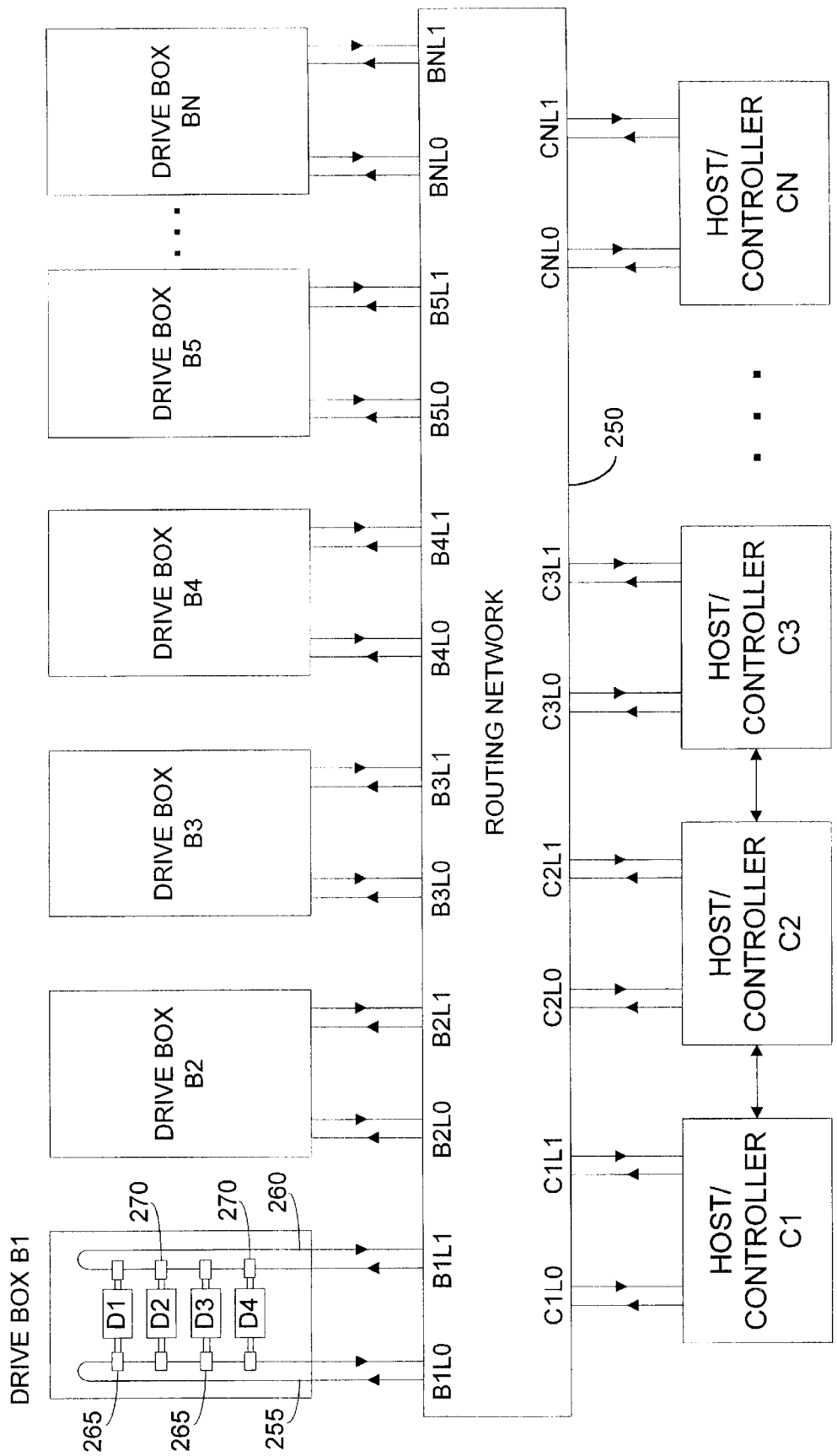
FIG. 3 is a block diagram of multiple hosts and devices in connection with a routing network for providing a dynamically configurable arbitrated loop system.

Referring now to FIG. 3, the block diagram shows how the present invention is clearly not limited to a dual loop/controller implementation (as discussed in reference to FIG. 1). Rather, FIG. 3 depicts how the invention is equally applicable to a system embodying multiple host controllers C1, C2, and C3 through CN (C1–CN) and multiple target devices B1, B2, B3, B4 and B5 through BN (B1–BN) in connection with a routing (switching) network 250 for providing a dynamically configurable arbitrated multi-loop system. Routing network 250 has two bi-directional connections for each controller C1–CN and each target device B1–BN.

In this example, each target device (drive box or enclosure) B1–BN contains multiple disk mechanisms with dual arbitrated loop segments connected to each of the disk mechanisms'dual ports. For example, drive box B1 depicts four disk drives D1, D2, D3 and D4 (D1–D4) connected to loops 255 and 260 via PBCs 265 and 270 respectively. The disk mechanism/loop configuration of B1 is similar to that of FIG. 1. The detail configuration for the other drive boxes B2–BN is not shown to simplify the drawing. However, each drive box B2–BN may be configured similar to drive box B1, or each may be configured differently, such as with more or less drives or different sized drives (albeit in a preferred embodiment, each drive is dual ported and connected to dual loops via respective PBCs).

Each drive box B1–BN is attached to routing network 250 through respective links (ports). Namely, drive box B1 connects to routing network 250 via links B1L0 and B1L1, and drive box B2 connects to routing network 250 via links B2L0 and B2L1, and so forth. These links/ports will be referred to as B1L0–BNL1. Similarly, host/controller devices C1–CN connect to routing network 250 via respective links. For example, C1 connects via links C1L0 and C1L1, and C2 connects via links C2L0 and C2L1, and so forth. These links/ports will be referred to as C1L0–CNL1.

Routing network 250 is any conventional routing network that is capable of interconnecting any subset or all of ports C1L0–CNL1 to any subset or all of ports B1L0–BNL1. Specifically, routing network 250 connects any host/controller (or any multiple controllers) C1–CN with any drive box (or multiple boxes) B1–BN via the respective links C1L0–CNL1 and B1L0–BNL1. As such, multiple arbitrated loop configurations are achievable by connecting different controllers to different ports on different devices. Moreover, by selectively bypassing differing disk drive units (i.e., D1–D4) in the differing drive boxes B1–BN, dynamic loop sizing occurs to minimize overhead associated with each loop established. Again, redundancy is maintained and the system is optimized by judicious distribution of the bypassed ports among the loops. To this regard, the way in which all of the connections are made at any given moment during system operations can have a significant bearing on overall system performance. Accordingly, the optimal system configuration is not static but will vary with system loading conditions (as previously discussed with regard to dynamic load sharing). There are also upgrade, expansion and/or modification considerations, such as for the addition and/or removal of devices, controllers and/or loops, that affect overall system performance and dynamic system reconfiguration parameters.

In essence, a dynamic system configuration includes applying intelligent control to routing network 250 in order to optimize the system configuration on a discretely continuous basis. In one embodiment, the intelligent control is operable via firmware/circuitry in the host controllers C1–CN (see 115, 120 of FIG. 1). The intelligent control involves dynamic loop sizing, dynamic load sharing, and management of the interconnection of multiple loops and controllers. Proper control and topology preserves the redundancy of the system. For example, a topology is easily configured between controllers C1 and C2 and drive boxes B1 and B2 that creates dual arbitrated loops and judiciously distributed disk mechanisms on those loops, similar to the example of FIG. 1. On the other hand, many other scenarios are also workable. For example, if three controllers C1–C3 are utilized in connection with two drive boxes B1 and B2, then one possible multi-loop configuration is as follows:

loop A—B1L0, C1L0 and C3L0
loop B—B1L1 and C1L1
loop C—B2L0, C2L0 and C3L0
loop D—B2L1 and C2L1

The odd number of controllers creates an uneven distribution of controllers on the loops. However, the PBCs (i.e., 265, 270, etc.) are then adjusted to produce a skewed distribution of drives on the loops in response to the controller bandwidth on each of the loops and their traffic patterns. For example, one possible optimization might be to place more drives onto loops A and B since there are more controller resources available on these loops. Another might be to place fewer drives on loops A and B so that they can be very responsive while loops C and D are used for less frequently accessed data.

Another exemplary multi-loop configuration may be:

loop A—C1L0, B1L0 and B2L0
loop B—C1L1, B3L0 and B4L0 loop C—C2L0, B1L1 and B2L1
loop D—C2L1, B3L1 and B4L1

This configuration defines two controllers C1 and C2 with four drive boxes B1, B2, B3 and B4, and four loops.

Obviously, various other loop configurations and drive bypass schemes are also feasible.

Finally, routing network 250 allows for the on-line addition/deletion of controllers and/or target devices; provides a mechanism for enabling smart or dynamic configuration of resources and arbitration loops; and provides for enabling features such as: (i) removing system configuration knowledge requirements from a user's perspective; (ii) automatically adapting system configurations to match work load or fault conditions; (iii) providing remote administration for adaptive system configurations; and (iv) enhancing system diagnostics.

Referring now to FIG. 4, a flow diagram depicts a preferred method of the present invention. First, system resources are identified 200. This includes all target devices, respective PBCs, host/controller devices, and type of routing network for building loops among the devices. Moreover, in the event the target devices are disk drives, for example, criteria such as storage capacities, access speeds, RAID schemes, etc. are considered. Next, 205, a redundant system is configured using the routing network (i.e., multiple loops are established) and based on the identified resources available. Then, 210, subsets of ports are identified on each loop that are to be bypassed while keeping system redundancy. These are identified per criteria such as number of loops, number of target devices and controller devices, load balancing schemes, etc. Again, for example, in the event the target devices are disk drives, criteria such as storage capacities, access speeds, RAID schemes, etc. are considered. Once the subsets of devices are identified on each loop, then those ports are inactivated 215 via their respective PBCs to establish a communication transmission path on each loop which is reduced in data transmission round trip delay time relative to the entire number of operational and/or dysfunctional devices on the loop. The system is now ready for normal operations.

Next, if a communication transmission is requested by/to a device 220, then the loop on which the device is located is identified 225, and communications are enabled via that loop 230 (i.e., arbitration begins and data transfer occurs). Communication traffic is monitored 235 so that load balancing may be optimized. Similarly, resources are monitored so that system configurations may be dynamically configured relative to loop paths, loop sizing and load sharing as previously discussed. If system changes occur 240, dynamic reconfiguration may again occur to provide optimized redundancy, performance and/or efficiency.

Finally, what has been described above are the preferred embodiments of a system and method for improving the performance of a Fibre Channel arbitrated loop in a redundant system. While the present invention has been described by reference to specific embodiments, it will be apparent that other alternative embodiments and methods of implementation or modification may be employed without departing from the true spirit and scope of the invention.

What is claimed is:

1. A communication system comprising:
   (a) at least a first and a second communication link redundantly interconnecting at least a first host device with a plurality of target devices via routing devices, the communication links being enabled for sustaining communication transmissions; and,
   (b) control apparatus enabled to control the routing devices such that the communication transmissions bypass a first subset of the target devices relative to the first communication link, and bypass a second subset of the target devices relative to the second communication link, wherein each subset includes at least one operational target device, and wherein each subset is bypassed during normal communication system operating conditions for improved system performance and efficiency of communication transmissions.

2. The communication system of claim 1 wherein the at least first and second communication links provide point to point communication in a loop topology.

3. The communication system of claim 2 wherein the point to point communication is a serial communication architecture for transmitting data unidirectionally.

4. The communication system of claim 2 wherein each communication link is a separate fibre channel arbitrated loop.

5. The communication system of claim 2 wherein the bypass of each subset reduces a round trip delay of the communication transmissions relative to the loop topology.

6. The communication system of claim 1 wherein a subset of the plurality of target devices are disk drives.

7. The communication system of claim 1 wherein each routing device is a port bypass circuit (PBC) associated with a respective target device and a respective communication link.

8. The communication system of claim 1 wherein the first and second subsets of target devices are established to provide load sharing among the plurality of target devices and communication links.

9. The communication system of claim 1 wherein the at least first and second communication links in combination provide a redundancy configuration for communication transmissions between the at least first host device and plurality of target devices for failover operations and for dynamic management of communication transmissions relative to the communication links and plurality of target devices.

10. The communication system of claim 1 wherein the first and second subsets of target devices are mutually exclusive.

11. The communication system of claim 1 wherein the control apparatus controls the routing devices such that a given operational target device of the plurality of target devices is not bypassed on a given one of the communication links in the event the given target device is bypassed on the other of the communication links.

12. The communication system of claim 1 further including reconfiguration apparatus for dynamically reconfiguring communication links and subsets of devices.

13. The communication system of claim 12 wherein the reconfiguration apparatus dynamically reconfigures the communication links and subsets of devices based on one or more of the following parameters: communication system operational efficiency, performance and failover objectives, and system growth or reduction in devices.

14. The communication system of claim 12 wherein the reconfiguration apparatus for dynamically reconfiguring the communication links and subsets of devices comprises a routing network and control intelligence for configuring loops and bypassing devices.

15. The communication system of claim 1 wherein the first and second subsets of target devices are overlapping.

16. The communication system of claim 1 wherein the first and second subsets of target devices are the same.

17. A redundant communication system comprising:
   (a) one or more fibre channel arbitrated loops interconnecting one or more controller devices and a plurality of target devices via a respective plurality of routing devices;

(b) communication lines interconnecting the one or more controller devices with the routing devices; and, (c) management apparatus in connection with the one or more controller devices for managing the routing devices such that communication transmissions bypass a unique subset of the target devices on each loop via the respective routing devices, wherein each subset includes at least one operational target device, and wherein each subset is bypassed during normal communication system operating conditions for improved system performance and efficiency of communication transmissions.

18. A method for improving performance in a redundant communication system having at least one controller device, a plurality of target devices, a respective plurality of routing devices, and at least two communication links interconnecting the at least one controller device and target devices via the routing devices, the method comprising the steps of:

(a) establishing a communication transmission path for each communication link such that a subset of target devices particular to each link are bypassed via the respective routing devices, each subset including at least one operational target device, and wherein each subset is bypassed during normal communication system operating conditions for improved system performance and efficiency of communication transmissions; and, (b) enabling communication transmissions to a selected target device via the respective communication link for which the selected target device is not bypassed.

19. The method of claim 18 wherein the communication links provide point to point communication in a loop topology and wherein the bypassing of each subset reduces a round trip delay of the communication transmissions relative to the loop topology.

20. The method of claim 18 wherein each communication link is a separate fibre channel arbitrated loop.

21. The method of claim 18 further including dynamically altering the communication transmission path for one or more of the communication links such that a different subset or subsets of target devices are bypassed.

22. The method of claim 18 further including dynamically altering the communication transmission path for (a) one or more existing communication links, or for (b) one or more existing communication links in connection with (i) the addition of one or more new communication links or (ii) the removal of one or more communication links, based on one or more of the following parameters: communication system operational efficiency, performance and failover objectives, and system growth or reduction in devices.

23. A communication system comprising:

(a) at least one host device;

(b) a plurality of target devices;

(c) a routing network for interconnecting the at least one host device with any or all of the plurality of target devices, the routing network enabled to sustain communication transmissions; and, (d) control apparatus for controlling the routing network for interconnecting the at least one host device with any or all of the plurality of target devices such that fibre channel loops are dynamically formed and such that for at least one of the loops formed over which communication transmissions occur, a subset of target devices, including at least one operational target device, is bypassed to reduce loop transmission delay on that loop as communication transmissions occur over that loop during normal communication system operating conditions.

24. The system of claim 23 wherein the control apparatus is the at least one host device.

25. The system of claim 23 wherein the control apparatus is firmware communicating with the at least one host device.

26. The communication system of claim 23 wherein the loops are dynamically formed based on one or more of the following parameters: system resources, system work load, system operational efficiency, performance and failover objectives, and system growth or reduction in devices.

27. A computer-readable medium having computer-executable instructions for enabling operation in a redundant communication system having at least one controller device, a plurality of target devices, a respective plurality of routing devices, and at least two communication links interconnecting the at least one controller device and target devices via the routing devices, the computer-executable instructions for performing steps including:

(a) establishing a communication transmission path for each communication link such that a subset of target devices particular to each link are bypassed via the respective routing devices, each subset including at least one operational target device, and wherein each subset is bypassed during normal communication system operating conditions for improved system performance and efficiency of communication transmissions; and, (b) enabling communication transmissions to a selected target device via the respective communication link for which the selected target device is not bypassed.

* * * * *